(12) United States Patent
Newhall, Jr.

(10) Patent No.: US 6,323,870 B1
(45) Date of Patent: Nov. 27, 2001

(54) TEXTURE ALPHA DISCRIMINATION A METHOD AND APPARATUS FOR SELECTIVE TEXTURE MODULATION IN A REAL TIME GRAPHICS PIPELINE

(75) Inventor: William Parsons Newhall, Jr., Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/327,016

(22) Filed: Jun. 7, 1999

(51) Int. Cl.[7] .................................................. G06T 11/40
(52) U.S. Cl. ............................................................... 345/582
(58) Field of Search ..................................... 345/430, 582

(56) References Cited

U.S. PATENT DOCUMENTS 6,118,452 * 9/2000 Gannett .

OTHER PUBLICATIONS

Porter, Tom et al., "Compositing Digital Images", Proceedings of SIGGRAPH '84, in Computer Graphics 18,3(Jul. 1984), pp. 253–259.

Reeves, W. et al., "Rendering Anti–aliased Shadows with Depth Maps", Proceedings of SIGGRAPH '87, pp. 283–291.

Segal, M. et al., "Fast Shadows and Lighting Effects Using Texture Mapping", Proceedings of SIGGRAPH 92,(Jul. 1992), pp. 249–252.

* cited by examiner

Primary Examiner—Jeffery Brier
(74) Attorney, Agent, or Firm—Scully, Scott, Murphy & Presser

(57) ABSTRACT

A process, referred to as alpha discrimination, for processing a texture data value in a computer graphics display system. With a preferred embodiment, the process of alpha discrimination occurs during the rendering of a drawing primitive between the stages of texture memory fetch and texture filter in the traditional graphics pipeline. After an initial texture data value is fetched, or identified, a determination is made as to whether the discrimination procedure is enabled or not enabled. If that procedure is not enabled, then the initial texture data value is passed to a predetermined element of the graphics display system, such as the texture filter. But if the discrimination procedure is enabled, then a preset test is performed. The initial texture data value is processed on the basis of the result of the test to produce a processed texture data value, and that processed texture data value is then passed to the predetermined element of the graphics display system.

46 Claims, 14 Drawing Sheets

THE ALPHA DISCRIMINATOR DESIGN BLOCK

THE ALPHA DISCRIMINATOR DESIGN BLOCK

LOGIC AND DATA FLOW FOR A SINGLE TEXEL ALPHA DISCRIMINATOR

```
#define COMMAND_VALID 1
#define CMD_UPDATE_CTRLW 2
#define CMD_UPDATE_ALPHA_REF 4
#define CMD_UPDATE_TRUE_VAL 6
#define CMD_UPDATE_FALSE_VAL 8
#define CTRLW_ENABLEALPHAMOD 256
#define CTRLW_ENABLECOLORMOD 1024
#define CTRLW_RETAINALPHA 512
#define CTRLW_RETAINCOLOR 2048
#define CTRLW_EQUALCMP 4096
#define CTRLW_GREATERCMP 8192
#define CTRLW_LESSCMP 16384
#define CTRLW_ZEROCMP 32768
#define CTRLW_ALPHAONE 65536

Class TextureAlphaDiscriminator
{
public:
    TextureAlphaDiscriminator(unsigned int * cmdinpt, unsigned int * inp0, unsigned int *inp1, unsigned int *inp2, unsigned int *inp3, unsigned int *out0, unsigned int *out1, unsigned int * out2, unsigned int *out3);
    // destructor function called when simulation terminates
    ~TextureAlphaDiscriminator();
    // function called by simulation for each clock cycle_
    void Go();

private:
    // wires
```

FIG. 5A

```
unsigned int *Command input; // pointer to command input control word
unsigned int *TexelInput0; // pointers to inputs (outputs from texture memory fetch)
unsigned int *TexelInput1;
unsigned int *TexelInput2;
unsigned int *TexelInput3;
unsigned int *TexelOutput0;//pointers to outputs (texture filter inputs)
unsigned int *TexelOutput1;
unsigned int *TexelOutput2;
unsigned int *TexelOutput3;

// registers
unsigned int TrueValue; // value which replaces true values(when discriminator is enabled and in replace mode)
unsigned int FalseValue; // value which replaces false values(when discriminator is enabled)
unsigned int TexAlphaDiscriminationCtrl; // texture alpha discriminator control word
unsigned int TextureAlphaRef; // texture alpha reference value
};
TextureAlphaDiscriminator:: TextureAlphaDiscriminator(unsigned int * cmdinpt, unsigned int * inp0, unsigned int *inp1,
unsigned int *inp2, unsigned int *inp3, unsigned int *out0, unsigned int *out1, unsigned int* out2, unsigned int *out3)
{
// connect wires to registers outside the TextureAlphaDiscriminator design block
TexelInput0 = inp0; TexelInput1 = inp1; TexelInput2 = inp2; TexelInput3 = inp3;
TexelOutput0 = out0; TexelOutput1 = out1; TexelOutput2 = out2; TexelOutput3 = out3;
CommandInput = cmdinpt;
```

TextureAlphaDiscriminator::~ TextureAlphaDiscriminator()
{
} void TextureAlphaDiscriminator::Go()
{
unsigned int CommandValue, match0, match1, match2, match3;

// check command register
  if (*CommandInput & 1 !-0) // if command valid
  {
    CommandValue = (*CommandInput & 0xff) >> 1;

switch (CommandValue)
    {
        case 1: // Set Control Word
        TexAlphaDiscriminatorCtrl = ((*CommandInput)>> 8);
        break;
        case 2: // Set Alpha Reference Value
        TextureAlphaRef = ((*CommandInput)>> 8) & 0xff;
        break;
            case 3: // Set Replacement True Value
            TrueValue = ((*CommandInput) >>8) & 0xff;
        break;
        case 4: // Set False Value
        FalseValue = ((*CommandInput) >> 8)& 0xff;
        break;
    }
    *CommandInput = *CommandInput & 0xfe; // Clear Command Valid bit
    return;
  }
```

FIG. 5C

```
if ((TexAlphaDiscriminationCtrl & 5) ==0)
{ // if control word states that neither alpha or color are to be modified
  // copy inputs to outputs unmodified.
  *TexelOutput0 = *TexelInput0;
  *TexelOutput1 = *TexelInput1;
  *TexelOutput2 = *TexelInput2;
  *TexelOutput3 = *TexelInput3;
  return;
}
// perform compare
match0 = match1 = match2 = match3 = 0; // set match values to zero by default(indicating no match)
// perform enabled match tests
if ((TexAlphaDiscriminationCtrl & 16) == 16) // true if texture alpha equals ref. alpha
{
  if (((*TexelInput0 & 0xff)==TextureAlphaRef) match0 = 1;
  if (((*TexelInput1 & 0xff)==TextureAlphaRef) match1 = 1;
  if (((*TexelInput2 & 0xff)==TextureAlphaRef) match2 = 1;
  if (((*TexelInput3 & 0xff)==TextureAlphaRef) match3 = 1;
}
```

FIG. 5D

```
if ((TexAlphaDiscriminationCtrl & 32) ==32)) // true if texture alpha is > ref. alpha
{
    if ((*TexelInput0 & 0xff)>TextureAlphaRef) match0 = 1;
    if ((*TexelInput1 & 0xff)>TextureAlphaRef) match1 = 1;
    if ((*TexelInput2 & 0xff)>TextureAlphaRef) match2 = 1;
    if ((*TexelInput3 & 0xff)>TextureAlphaRef) match3 = 1;
}
if ((TexAlphaDiscriminationCtrl & 64) ==64)) // true if texture alpha is < ref. alpha
{
    if ((*TexelInput0 & 0xff)<TextureAlphaRef) match0 = 1;
    if ((*TexelInput1 & 0xff)<TextureAlphaRef) match1 = 1;
    if ((*TexelInput2 & 0xff)<TextureAlphaRef) match2 = 1;
    if ((*TexelInput3 & 0xff)<TextureAlphaRef) match3 = 1;
}
if ((TexAlphaDiscriminationCtrl & 128) ==128)) // true if texture alpha is equal to zero
{
    if ((*TexelInput0 & 0xff)== 0 ) match0 == 1;
    if ((*TexelInput1 & 0xff)== 0 ) match1 == 1;
    if ((*TexelInput2 & 0xff)== 0 ) match2 == 1;
    if ((*TexelInput3 & 0xff)== 0 ) match3 == 1;
}
if (TexAlphaDiscriminationCtrl & 1) // alpha modificaton enabled
{
    if (TexAlphaDiscriminationCtrl & 2)
    { // modulate
        if (match0 !=0) { *TexelOutput0 = *TexelInput0 & 0xff; }else{ *TexelOutput0 = False Value; }
        if (match0 !=0) { *TexelOutput1 = *TexelInput1 & 0xff; }else{ *TexelOutput1 = False Value; }
        if (match0 !=0) { *TexelOutput2 = *TexelInput2 & 0xff; }else{ *TexelOutput2 = False Value; }
        if (match0 !=0) { *TexelOutput3 = *TexelInput3 & 0xff; }else{ *TexelOutput3 = False Value; }
    }
}
```

FIG. 5E

```
else
{ // replace
    if (match0 !=0) {*TexelOutput0 = TrueValue; }else{*TexelOutput0 = FalseValue; }
    if (match0 1=0) {*TexelOutput1 = TrueValue; }else{*TexelOutput1 = FalseValue;}
    if (match0 2=0) {*TexelOutput2 = TrueValue; }else{*TexelOutput2 = FalseValue;}
    if (match0 3=0) {*TexelOutput3 = TrueValue; }else{*TexelOutput3 = FalseValue;}
}
}
else
{ // retain original alpha input value in alpha output value
    *TexelOutput0 = *TexelInput0 & 0xff;
    *TexelOutput1 = *TexelInput1 & 0xff;
    *TexelOutput2 = *TexelInput2 & 0xff;
    *TexelOutput3 = *TexelInput3 & 0xff;
} if ((TexAlphaDiscriminationCtrl & 4) !=0) // color modification enabled
{
if (TexAlphaDiscriminatonCtrl & 4)
{ // retain original values when compare is true
if (match0 !=0) { *TexelOutput0 = (*TexelOutput0 & 0xff)| (*TexelInput0 & 0xffffff00); } else
{*TexelOutput0 = (*TexelOutput0 & 0xff)|((FalseValue << 8)|(FalseValue << 16)|(FalseValue << 24)); }
if (match1 !=0) { *TexelOutput1 = (*TexelOutput1 & 0xff)| (*TexelInput1 & 0xffffff00); } else
```

FIG. 5F

```
{*TexelOutput1 = (*TexelOutput1 & 0xff)|((FalseValue <<8) | (FalseValue <<16) | (FalseValue << 24)); }
if (match2 !=0) {*TexelOutput2 = (*TexelOutput2 & 0xff )|(*TexelInput2 & 0xffffff00); } else
{*TexelOutput2 = (*TexelOutput2 & 0xff)|((FalseValue <<8) | (FalseValue <<16) | (FalseValue << 24)); }
if (match3 !=0) {*TexelOutput3 = (*TexelOutput3 & 0xff )|(*TexelInput3 & 0xffffff00); } else
{*TexelOutput3 = (*TexelOutput3 & 0xff)|((FalseValue <<8) | (FalseValue <<16) | (FalseValue << 24)); }
}
else
{ // replace each color component with the user defined true value
if (match0 !=0)
{*TexelOutput0 = (*TexelOutput0 & 0xff)|((TrueValue << 8) | (TrueValue << 16) | (TrueValue << 24)); } else
{*TexelOutput0 = (*TexelOutput0 & 0xff)|((FalseValue << 8) | (FalseValue << 16) | (FalseValue << 24)); }
if (match1 !=0)
{*TexelOutput1 = (*TexelOutput1 & 0xff)|((TrueValue << 8) | (TrueValue << 16) | (TrueValue << 24)); } else
{*TexelOutput1 = (*TexelOutput1 & 0xff)|((FalseValue << 8) | (FalseValue << 16) | (FalseValue << 24)); }
if (match2 !=0)
{*TexelOutput2 = (*TexelOutput2 & 0xff)|((TrueValue << 8) | (TrueValue << 16) | (TrueValue << 24)); } else
{*TexelOutput2 = (*TexelOutput2 & 0xff)|((FalseValue << 8) | (FalseValue << 16) | (FalseValue << 24)); }
if (match3 !=0)
{*TexelOutput3 = (*TexelOutput3 & 0xff)|((TrueValue << 8) | (TrueValue << 16) | (TrueValue << 24)); } else
{*TexelOutput3 = (*TexelOutput3 & 0xff)|((FalseValue << 8) | (FalseValue << 16) | (FalseValue << 24)); }
}
```

FIG. 5G

```
else
{
    *TexelOutput0 = (*TexelOutput0) | (*TexelInput0 & 0xffffff00);
    *TexelOutput1 = (*TexelOutput1) | (*TexelInput1 & 0xffffff00);
    *TexelOutput2 = (*TexelOutput2) | (*TexelInput2 & 0xffffff00);
    *TexelOutput3 = (*TexelOutput3) | (*TexelInput3 & 0xffffff00);
} if (TexAlphaDiscriminationCtrl & 256)
{ // set alpha value to a contant value(255) regardless of compare result if enabled
    *TexelOutput0 = (*TexelOutput0) | (*TexelInput0 | 0xff);
    *TexelOutput1 = (*TexelOutput1) | (*TexelInput1 | 0xff);
    *TexelOutput2 = (*TexelOutput2) | (*TexelInput2 | 0xff);
    *TexelOutput3 = (*TexelOutput3) | (*TexelInput3 | 0xff);
}
```

FIG. 5H

Command and Data Formats Used By The Alpha Discriminator

Command Input Format
32 Bits Wide
Bit 0 — Command Valid if set (set to zero by discriminator after command processed)
Bits 1 - 7 — Command ID
Bits 8 - 31 — Command Data

Update Texture Alpha Discrimination Control Word Command Format
Bit 0 — Command Valid if set (set to zero by discriminator after command processed)
Bits 1 - 7 — Command ID(1 - Update Control Word)
Bits 8 - 15 — New Texture Alpha Discrimination Control Word Value
Bits 16 - 31 — Reserved(Set to zero)

Update Texture Alpha Reference Value Command Format
32 Bits Wide
Bit 0 — Command Valid if set (set to zero by discriminator after command processed)
Bits 1 - 7 — Command ID(2 - Update Reference Value)
Bits 8 - 15 — Reference Value(0 - 255)
Bits 16 - 31 — Reserved(Set to zero)

Update Replacement True Value Command Format
32 Bits Wide
Bit 0 — Command Valid if set (set to zero by discriminator after command processed)
Bits 1 - 7 — Command ID(3 - Update Replacement True Value)
Bits 8 - 15 — True Value(0 - 255)
Bits 16 - 31 — Reserved(Set to zero)

Update False Value Command Format
32 Bits Wide
Bit 0 — Command Valid if set (set to zero by discriminator after command processed)
Bits 1 - 7 — Command ID(4 - Update False Value)
Bits 8 - 15 — False Value(0 - 255)
Bits 16 - 31 — Reserved(Set to zero)

Texture Alpha Discrimination Control Word Format
32 Bits Wide
Bit 0 — Enable Alpha Modification (0 - Disable 1 - Enable)
Bits 1 — Replace/Modulate Alpha Bits(0 - Replace 1 - Retain)
Bits 2 — Enable Color Modification(0 - Disable 1 - Enable)
Bits 3 — Replace/Modulate Color Bits(0 - Replace 1 - Retain)
Bits 4 — Enable True Result if texel alpha is equal to texture alpha reference value
Bits 5 — Enable True Result if texel alpha is greater than texture alpha reference value
Bits 6 — Enable True Result if texel alpha is less than texture alpha reference value
Bits 7 — Enable True Result if texel alpha is equal to zero
Bits 8 — Replace Alpha Bits With Ones if set

Texture Alpha Reference Value
8 Bits Wide
Bits 0 - 7 — Texture Alpha Reference Value(0-255)

Texel Input Format
32 Bits Wide
Bit 0 - 7 — Texel Alpha Channel (0-255)
Bits 8 - 15 — Texel Blue Channel (0-255)
Bits 16 - 23 — Texel Green Channel (0-255)
Bits 24 - 31 — Texel Red Channel (0-255)

Texel Output Format
32 Bits Wide
Bit 0 - 7 — Texel Alpha Channel (0-255)
Bits 8 - 15 — Texel Blue Channel (0-255)
Bits 16 - 23 — Texel Green Channel (0-255)
Bits 24 - 31 — Texel Red Channel (0-255)

FIG. 51

TEXTURE ALPHA DISCRIMINATION A METHOD AND APPARATUS FOR SELECTIVE TEXTURE MODULATION IN A REAL TIME GRAPHICS PIPELINE

FIELD OF THE INVENTION

This invention generally relates to computer graphics systems; and more specifically, the invention relates to the techniques of real time rendering with texture mapping in the field of computer graphics systems.

BACKGROUND OF THE INVENTION

Texture Mapping

Texture mapping is a commonly employed technique for adding detail in computer graphics rendering to achieve a high degree of realism in the rendered image. Each drawing primitive (i.e. each polygon) is specified with texture coordinates at its vertices which describe corresponding locations within an array of memory locations in a memory storage device, referred to as a texture. As the primitive is rasterized pixel-by-pixel, the texture coordinates are interpolated to arrive at a corresponding texel address within the texture.

The contents of the texture at the interpolated address are fetched from the memory device and are used to affect the color of the pixel value stored in the frame buffer. There are a number of ways that a texel value can affect the color of the pixel stored in the frame buffer. In most cases, the texel value is used to either modulate or replace a luminance or color value interpolated between color or luminance values specified or computed at the vertices of the drawing primitive.

Alpha Blending

In computer graphics and image processing, it often is necessary to combine color values from separate sources into a composite color value. It is a standard practice in the field of computer graphics to represent an image as a set pixels each of which has four distinct values: Red, Green, Blue, and Alpha. Red, Green and Blue are additive primary components in the RGB color space. The alpha channel contains information used to weight the Red, Green, and Blue values when combining them with colors from other sources. Also, the alpha channel is often used to represent the opacity of a material or the amount of pixel area covered by a polygon.

When a translucent or partially covered pixel is to be written to a location in the frame buffer, the incoming value may be combined with the value already stored at the location and the resulting composite color may be stored in the location. The alpha values are used to weight the contribution of the source (incoming) value with the destination (current) value in proportion to each value's opacity or area. Various operating standards, such as Open GL and Direct 3D, allow applications to specify conditions based upon the alpha value of an incoming pixel where a pixel write can be avoided (for example, when Alpha is equal to or nearly zero and the incoming pixel would have little or no effect).

Computation of Alpha From Depth Texture Comparison

A procedure in which depth values are compared against a texture coordinate is disclosed in "Fast Shadows and Lighting Effects Using Texture Mapping", *Computer Graphics* (SIGGRAPH 1992 Proceedings), Vol. 26, No. 2, July 1992, pages 249–252, by M. Segal, C. Korobkin, R. van WidenFelt, J. Foran, and P. Haeberli. More specifically, this paper details a technique where four depth values fetched from a texture map are compared against a third texture coordinate which is interpolated between values specified at the vertices of the drawing primitive. If the depth texel's value is equal to or greater than the value of the third texture coordinate, then the texels value is replaced with a value of 1.0 otherwise the value is replaced with a value of 0.0. The resulting four texel values are then bilinearly interpolated to arrive at a single value between 0.0 and 1.0 which replaces the incoming pixel fragment's alpha value. Thus the fragment color interpolated between values specified at the vertices is attenuated by the alpha value before it is stored in the frame buffer.

SUMMARY OF THE INVENTION

An object of this invention is to provide a process, referred to as alpha discrimination, that is a method of enhancement to the process of texture mapping and which allows a texture to be selectively applied to incoming pixel fragments.

Another object of this invention is to provide an apparatus, called the alpha discriminator design block, which can be inserted into computer graphics rendering hardware to achieve the effects of alpha discrimination.

Alpha Discrimination

With a preferred embodiment of this invention, the process of aldha discrimination occurs during the rendering of a drawing primitive between the stages of texture memory fetch and texture filter in the traditional graphics pipeline. To enable the process of alpha discrimination, the host application preferably sets a control state variable to a non-zero value. To disable alpha discrimination the host application sets this variable to zero. When the control state variable is set to zero, the process of alpha discrimination merely passes the texel data from the texture memory fetch process to the texture filter process unmodified. When the control state variable is set to a non zero value, the process of alpha discrimination compares the alpha value of each texel fetched from memory against a reference state variable according to criteria specified in the control state variable.

With the embodiment described herein in detail, both the reference and control variables are set by the host application prior to issuing commands to begin rendering the drawing primitives which will be affected by them. If the result of the comparison between the texel's alpha value and the value stored in the reference variable is true, then the bits of the texel specified in the control state variable either retain their original input values or are replaced with ones (depending on whether the control state variable indicates modulation or replacement). Otherwise the bits of the texel specified in the control state variable are cleared. Each modified texel is passed on to the texture filtering process and the alpha discrimination process is complete.

For example, the process of alpha discrimination may be controlled by the host application using two control commands:

SetTexAlphaDiscriminationCtrl (unsigned CtrlVal) and
SetTextureAlphaRef (unsigned RefVal).

SetTextureAlphaRef(unsigned RefVal) sets the reference state variable, which may be identified as TextureAlphaRef, to the value specified in the argument RefVal. TextureAlphaRef will retain this value until the next time SetTextureAlphaRef(unsigned RefVal) is issued by the host application.

SetTexAlphaDiscriminationCtrl (unsigned CtrlVal) sets the control state variable, which may be identified as TexAlphaDiscriminationCtrl, to the value specified by the argument CtrlVal. TexAlphaDiscriminationCtrl will retain this value until the next time SetTexAlphaDiscriminationCtrl (unsigned CtrlVal) is issued by the host application. The TexAlphaDiscriminationCtrl state variable describes the criteria of comparison, which bits of the fetched texel (if any) are to be modified with the results of the alpha channel's compare against the reference value, and how those bits are to be modified.

Alpha Discriminator Design Block

The alpha discriminator design block is an apparatus which may be inserted between the texture memory fetch design block and the texture filter design block of a hardware graphics accelerator. For each texel output provided by the texture memory fetch design block the alpha discriminator has a texel input and a texel output. The alpha discriminator design block has a control word register similar to the TexAlphaDiscriminationCtrl state variable described in the section above and an N-bit reference value register (where N is the number oL bits used to represent alpha in the texel output of the texture memory fetch design block) which is used to hold a reference value similar to the TextureAlphaRef described above.

The control word register conveys the criteria of the comparison, which bits (if any) of the incoming texels are to be modified with the results of the compare, and how those bits are to be modified. If the control word states that no bits are to be modified, then the texel data passes through the texture alpha discriminator design block unmodified. In addition, preferably, the control word includes a bit that, when set, specifies that all the alpha bits are to be set to a predetermined constant value such as one.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIGS. 5A–5I shows the C++ source code that performs the process of Alpha Discrimination.

DETAILED DESCRIPTION OF THE PREFERRED EMBODIMENTS

Figure 1:
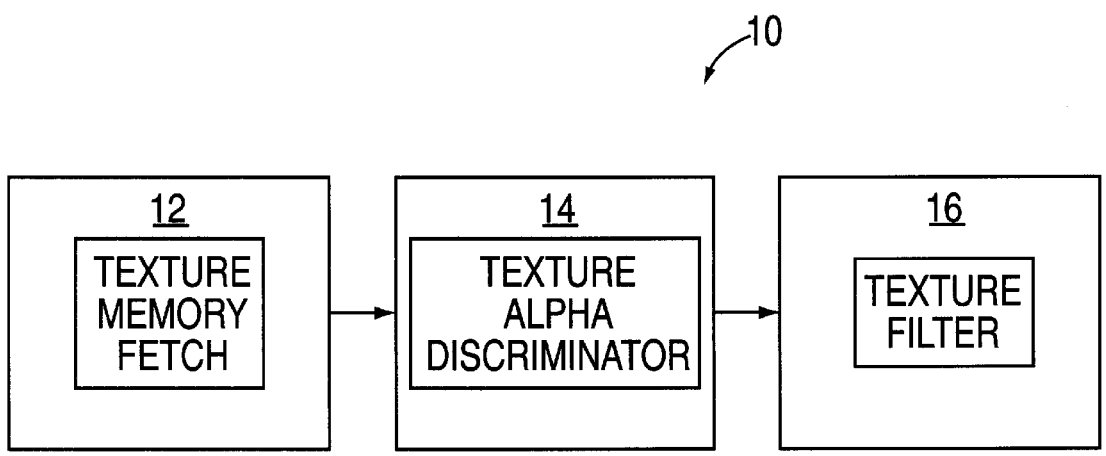
FIG. 1 depicts the location of a Texture Alpha Discriminator design block in a texture mapped graphics pipeline.

FIG. 1 generally illustrates a portion of a texture mapped graphics pipeline 10, including a Texture Memory Fetch 12, a Texture Alpha Discriminator 14, and a Texture Filter 16. Generally, in operation, the Texture Memory Fetch retrieves one or more texels from the memory containing texture data, and passes the data into the Texture Alpha Discriminator which may or may not alter the texel data. The Texture Alpha Discriminator passes the texel data to the Texture Filter which blends or selects texel red, green, blue and alpha values.

Figure 2A:
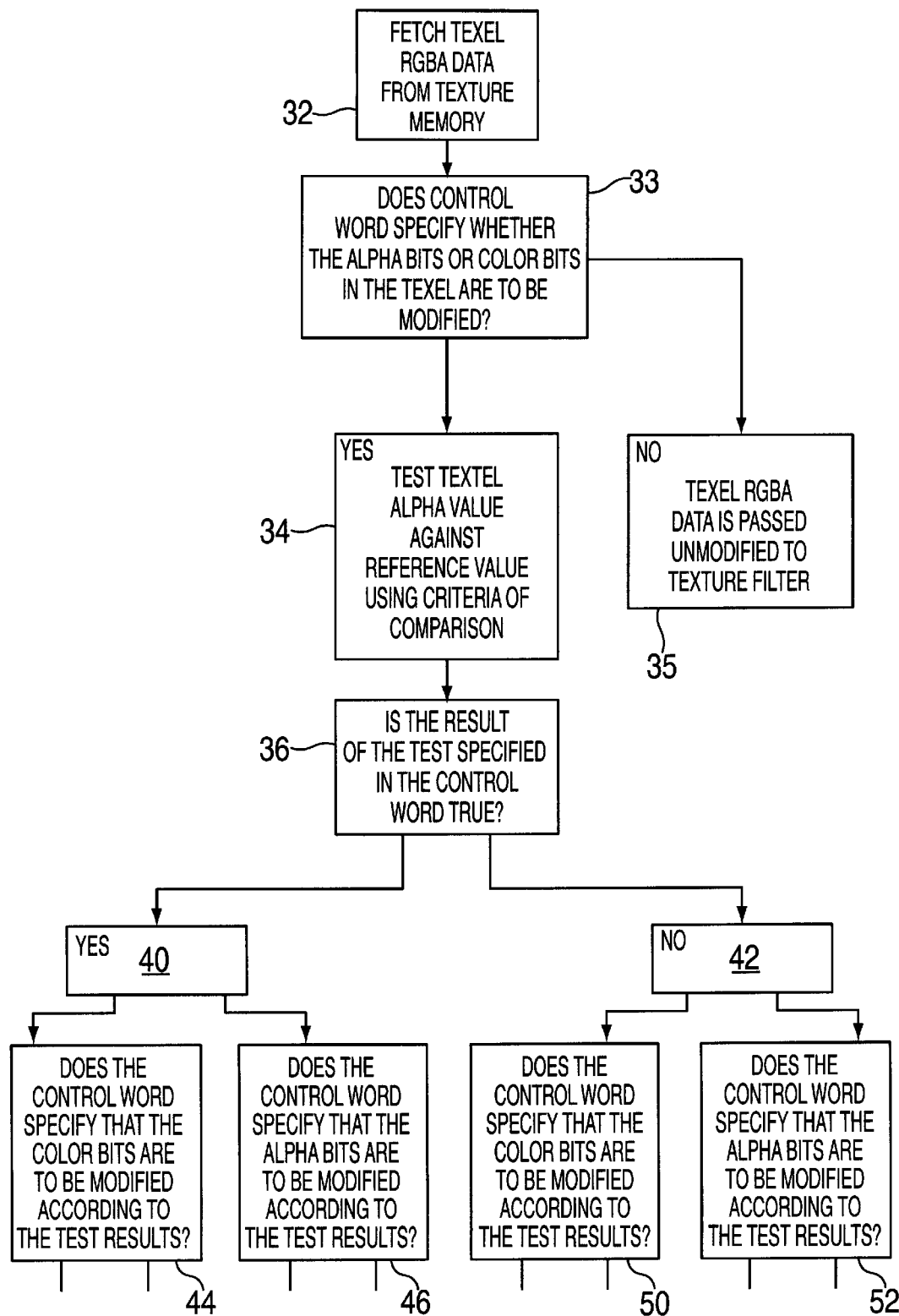
FIGS. 2A and 2B show the data flow within the process of Alpha Discrimination operating on a single texel.
Figure 2B:
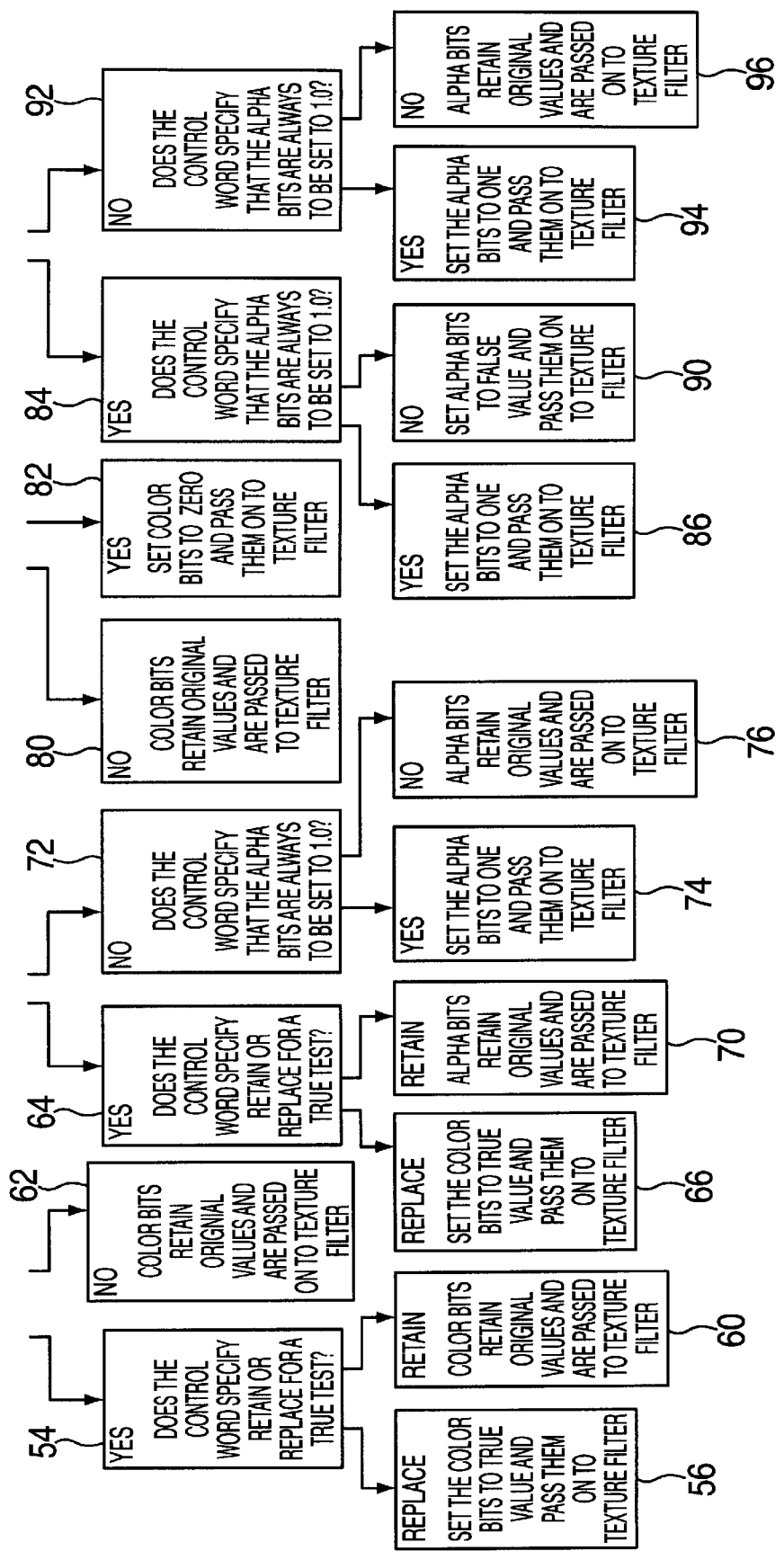

FIGS. 2A and 2B depict data flow within the process of Alpha Discrimination operating on a single texel. The texel data has been fetched from memory, as represented by block 32. If TexAlphaDiscriminationCtrl states that none of the alpha bits or color bits in the texel are to be modified, as represented by block 33, the texel data is passed on (unmodified) to the texture filter, as represented by block 35. If, however, alpha discrimination is enabled, the process proceeds to block 34 where the alpha bits of the input texel data are compared against the TextureAlphaRef state variable using each criteria of comparison enabled in the TexAlphaDiscrimiantionCtrl state variable.

If the result of any of the enabled criteria of comparison test as TRUE, then the texture alpha discrimination test result is YES, as represented in block 40, and the texture data is processed according to a TRUE test result. In contrast, if none of the enabled criteria of comparison test as TRUE, then the texture alpha discrimination test result is NO, as represented by block 42, and the texture data is processed according to a FALSE test result. With the embodiment of the invention disclosed herein in detail, if any of the enabled criteria compare as TRUE then those bits of the texel which have been specified for modification in the TexAlphaDiscriminationCtrl state variable are modified in the manner specified by the TexAlphaDiscriminationCtrl state variable.

In particular, if any of the enabled criteria compare as TRUE, then the process proceeds to block 40 and then to blocks 44 and 46. However, if none of the enabled criteria compare as TRUE, then the process moves on to blocks 42 and then to blocks 50 and 52. At blocks 44, 46, 50 and 52, the process checks the control word to determine whether the color bits, the alpha bits or both the color and alpha bits are to be modified according to the test results.

If, at block 44, the color bits are to be modified according to the test results, the process proceeds to block 54, where a check is made to determine whether the alpha discriminator is in the retain or replace mode. If the alpha discriminator is in the replace mode, then the color bits are set to a user specified predetermined value, represented as TrueValue, at block 56, and then passed on to the texture filter. If the process is in the retain mode, the color bits are passed unmodified to the texture filter at block 60. Also, if at block 44, it is determined that the color bits are not to be modified according to the test results, then these bits are passed unmodified to the texture filter at block 62.

If, at block 46, the alpha bits are to be modified according to the test results, then the procedure moves on to block 64, where a check is made to determine whether the control work specifies the retain or the replace mode. If the control word specifies the replace mode, then at block 66, the color bits are replaced with the value TrueValue, and then passed on to the texture filter at block 66. If the control word specifies the retain mode, the alpha bits are passed unmodified on to the texture filter, as represented by block 70.

If, at block 46, the alpha bits are not to be modified according to the test results, then the routine proceeds to block 72, where a check is made to determine whether the control word specifies that the alpha bits are always to be set to 1.0. If this is to be done, those bits are set to 1.0 at block 74, and this alpha value is passed to the texture filter at block 74. If the alpha bits are not to be set to 1.0, then the alpha bits are passed unmodified to the texture filter, as represented by block 76.

If, at block 50, the control word specifies that the color bits are not to be modified according to the test results, then those bits are passed unmodified to the texture filter, as represented by block 80. If those color bits are to be modified, then they are set to zero and passed on to the texture filter, as represented by block 82.

At block 52, if the control word specifies that the alpha bits are to be modified according to the test results, the routine proceeds to block 84, where a check is made to determine whether the control word specifies that the alpha bits are to be set to 1.0. If these bits are to be set to 1.0, this is done at block 86 and the new alpha value is passed on to the texture filter. If the control word does not specify that the alpha bits are to be set to 1.0, then, at block 90, the alpha bits are set to a user specified predetermined value, represented as FalseValue, and this new alpha value is passed on to the texture filter.

At block 52, if the control word specifies that the alpha bits are not to be modified according to the test results, the routine moves on to block 92, where, like at block 84, a check is made to determine whether the control word specifies that the alpha bits are to be set to 1.0. If the alpha bits are to be so set, this is done at block 94 and the new alpha value is sent on to the texture filter. However, if the alpha bits are not to be set to 1.0, then, as represented by block 96, the alpha bits are passed unmodified on to the texture filter.

In the preferred embodiment, as described above, the Texture Alpha Discriminator can be enabled to modify two groups of bits. These two sets are the color bits (those bits representing the Red, Green, and Blue color components in RGB color space) and the alpha bits (those bits used to weight the contribution of the texel color when it is combined or composited with other colors such as the color interpolated across the polygon or stored in the frame buffer) and modification can be enabled for one set, both sets, or no sets. If any bit groups are enabled for modification, then the texture alpha values are tested using the criteria of comparison specified in TexAlphaDiscriminationCtrl but how those bit groups are to the modified is unique for each bit group.

In the preferred embodiment there are four criteria of comparison which could be enabled. As discussed above, for the comparison to result in a value of TRUE one or more of the criteria of comparison enabled by the TexAlphaDiscriminationCtrl state variable have to be true. If none of the enabled criteria of comparison result in a value of true then the result of the compare is FALSE. The four criteria of comparison which can be enabled in the preferred embodiemnt are as follows:

1) if the alpha value fetched from the memory containing texture data is equal to the TextureAlphaRef value, then return TRUE.
2) if the alpha value fetched from memory containing texture data is less than the TextureAlphaRef value, then return TRUE.
3) if the alpha value fetched from memory containing texture data is greater than the TextureAlphaRef value, then return TRUE.
4) if the alpha value fetched from memory containing texture data is equal to zero, then return TRUE.

Figure 3:
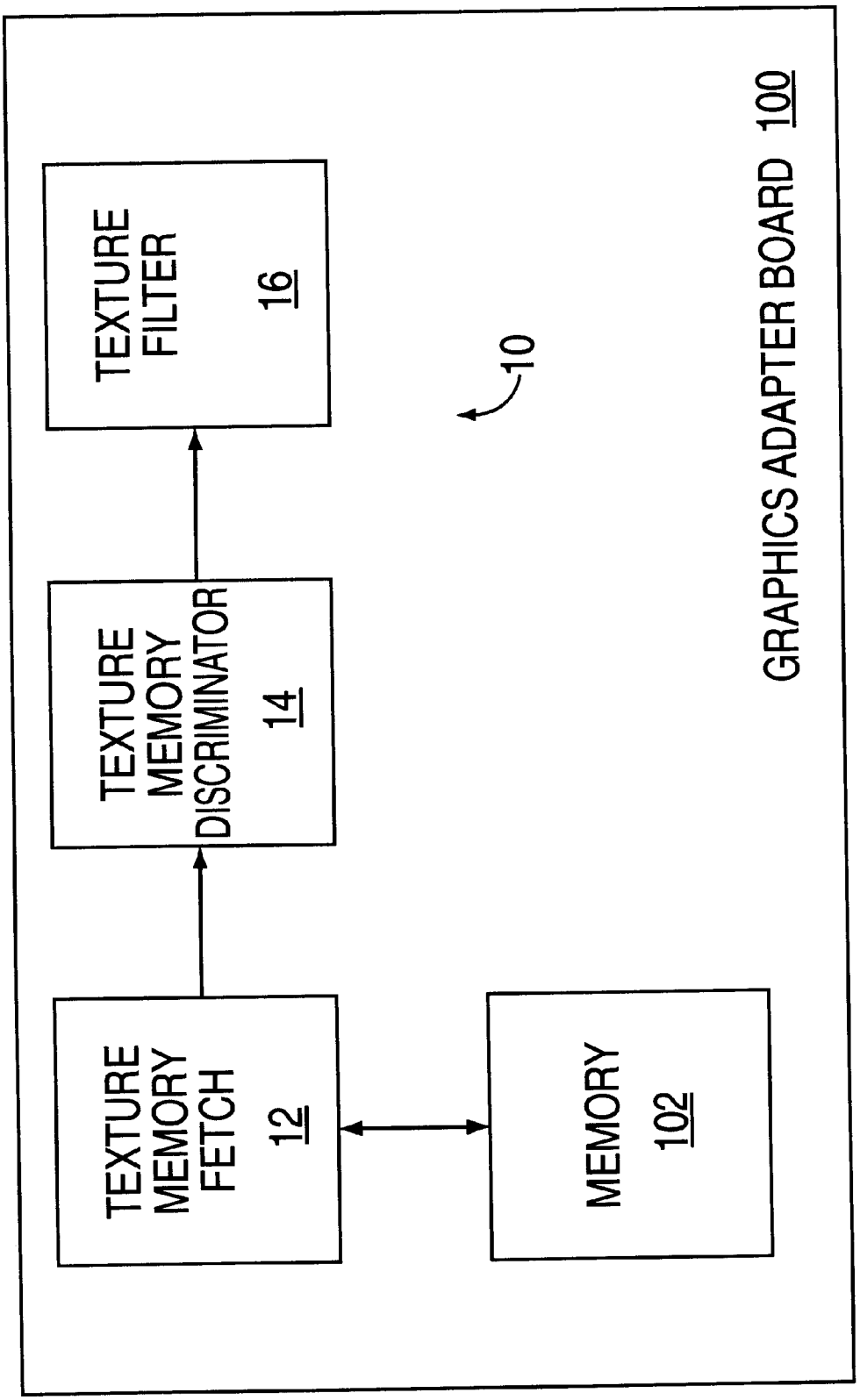
FIG. 3 schematically shows a graphics adapter board having the alpha discriminator design block.

Graphics pipeline 10 may be included in one integrated chip. This chip, in turn, may be one of several components of a larger board, such as a graphics adapter board, and FIG. 3 schematically shows such a board 100. This board includes memory fetch 12, texture alpha discriminator 14, texture filter 16, and memory 102, which contains the texture data values. As will be understood by those of ordinary skill in the art, board 100 may include additional elements.

Figure 4:
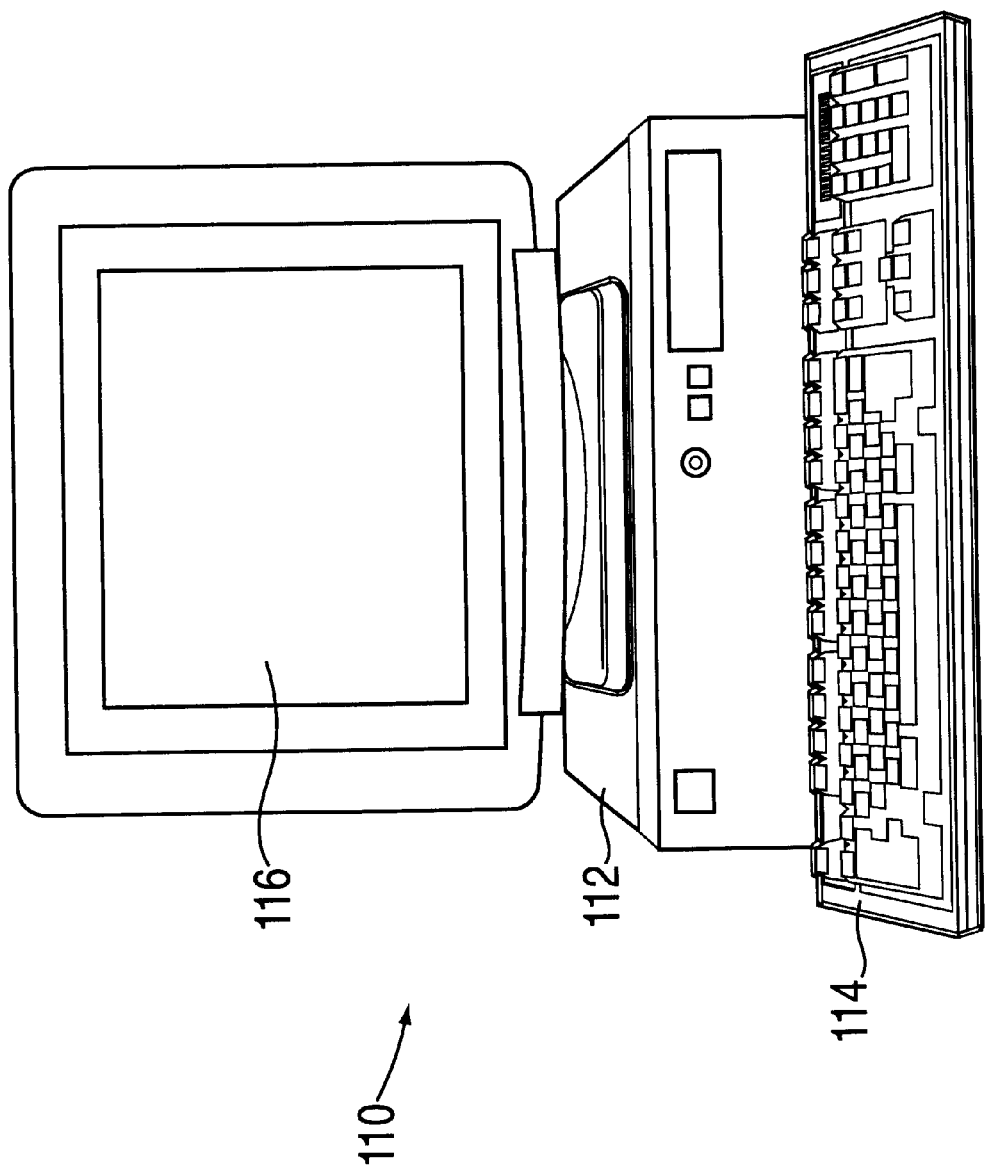
FIG. 4 illustrates a computer hardware system that may be used in the practice of this invention.

Also, any suitable computer system may be used to practice the invention, and FIG. 4 shows, as an example, one such computer system 110. System 110 includes a central processing unit 112, a conventional input keyboard 114, and a standard monitor 116. The processing unit includes graphics pipeline 10, which may be included in an otherwise standard or conventional graphics accelerator, modified as described above to incorporate the alpha discriminator unit.

FIGS. 5A–5H show the C++ source code as a detailed embodiment of the TextureAlpha Discriminator design block. This code simulates the function of objects of the alpha discriminator design block of FIG. 1, including memory fetch 12 and alpha discriminator 14. This code is suitable for use in a C++ hardware graphics architecture simulation. This C++ code defines an object class called Texture Alpha Discriminator which performs the process of Alpha Discrimination on four streams of 32-bit texels and is controlled by a 16-bit command word. In a typical graphics acceleration architecture, a TextureAlpha Discriminator object would be instantiated for each bilinear texture pipeline in the system and placed between the texture memory fetch and the texture filter. The TexAlphaDicriminationCtrl class constructor takes pointer arguments as to where the command word and each of the four input texel data values can be read from and where each of the four output texel data values should be written to. The Go ( ) function should be called once for each clock cycle during the run of the simulation.

The data formats used by the detailed embodiment and C++ source code of the detailed embodiment are listed in FIG. 5I.

As described above, a hardware component, the alpha discriminator, is used to perform the appropriate test, and to modify the initial texture values. As will be understood by those of ordinary skill in the art, a software program may be used to perform some or all of the functions of the alpha discriminator. Any suitable software program may be used for this purpose, and the design and implementation of such a software program is well within the ability of those of ordinary skill in the art.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A method in a computer graphics display system for processing a texture data value, the method comprising:
   identifying an initial texture data value including more than one component;
   determining whether a discrimination procedure is enabled or not enabled;
   if the discrimination procedure is enabled, then performing a preset test on a component of the texture data value not representing color or distance;
   processing the initial texture data value on the basis of the result of the test to produce a processed texture data value; and
   passing the processed texture data value to a predetermined element of the graphics display system.

2. A method according to claim 1, wherein the test has one of two results, and the processing step includes the steps of:
   processing the initial texture data value according to a first procedure if the test has a first of the two results;
   processing the initial texture data value according to a second procedure if the test has a second of the two results.

3. A method according to claim 2, wherein the first procedure is to set the processed texture data value equal to the initial texture data value.

4. A method according to claim 2, wherein the second procedure is to reset the initial texture value to a preset constant value to obtain the processed texture data value.

5. A method according to claim 1, wherein the performing step includes the step of comparing a predetermined reference value with a pre-identified parameter of the texture data value not representing color or distance.

6. A method according to claim 5, wherein the comparing step includes the step of determining if the value of the pre-identified parameter is equal to the predetermined reference value.

7. A method according to claim 5, wherein the comparing step includes the step of determining if the value of the pre-identified parameter is less than the predetermined reference value.

8. A method according to claim 5, wherein the comparing step includes the step of determining if the value of the pre-identified parameter is greater than the predetermined reference value.

9. A method according to claim 5, wherein the comparing step includes the step of determining if the value of the pre-identified parameter is equal to zero.

10. A method according to claim 1, wherein:
the initial texture data value is a fetched texture data value and has a preset number of component bits; and
the step of processing the initial texture data value includes the steps of
i) identifying a predetermined subset of said number of bits, and
ii) processing the predetermined subset of said number of bits according to the test results.

11. A method according to claim 10, wherein the step of performing a preset test includes the steps of:
defining a group of tests;
identifying one of the group of tests; and
performing the identified one of the group of tests;
wherein texture data can be tested by all, none or some of the defined tests, and wherein it is only necessary to get a TRUE result on one of the enabled tests for the texture data to be processed as TRUE.

12. A method according to claim 11, further including the step of providing a state variable that both identifies the one of the group of tests and identifies the predetermined subset of the number of bits.

13. A method according to claim 12, wherein the state variable also identifies whether the discrimination procedure is enabled or not enabled.

14. A method according to claim 1, further comprising the step of performing alpha discrimination on every texture data element which goes to a texture filter.

15. Apparatus for processing a texture data value in a computer graphics display system, the apparatus comprising:
means for identifying an initial texture data value including more than one component;
means for determining whether a discrimination procedure is enabled or not enabled;
means for performing a preset test on a component of the texture data value not representing color or distance if the discrimination procedure is enabled;
means for processing the initial texture data value on the basis of the result of the test to produce a processed texture data value; and
means for passing the processed texture data value to a predetermined element of the graphics display system.

16. Apparatus according to claim 15, wherein the test has one of two results, and the processing means includes:
means for processing the initial texture data value according to a first procedure if the test has a first of the two results; and
means for processing the initial texture data value according to a second procedure if the test has a second of the two results.

17. Apparatus according to claim 16, wherein the first procedure is to set the processed texture data value equal to the initial texture data value.

18. Apparatus according to claim 16, wherein the second procedure is to reset the initial texture value to a preset constant value to obtain the processed texture data value.

19. Apparatus according to claim 15, wherein the performing means includes means for comparing the value of a pre-identified parameter with a predetermined reference value.

20. Apparatus according to claim 19, wherein the comparing means comprises means for determining if the value of the pre-identified parameter is equal to the predetermined reference value.

21. Apparatus according to claim 19, wherein the comparing means includes means for determining if the value of the pre-identified parameter is less than the predetermined reference value.

22. Apparatus according to claim 19, wherein the comparing means includes means for determining if the value of the pre-identified parameter is greater than the predetermined reference value.

23. Apparatus according to claim 19, wherein the comparing means includes means for determining if the value of the pre-identified parameter is equal to zero.

24. Apparatus according to claim 15, wherein:
the initial texture data value is a fetched texture value and has a preset number of component bits; and
the processing means includes
i) means for identifying a predetermined subset of said number of bits, and
ii) means for processing the predetermined subset of said number of bits on the basis of the test results.

25. Apparatus according to claim 24, wherein the performing means includes:
means defining a group of tests;
means for identifying one of the group of tests; and
means for performing the identified one of the group of tests;
wherein texture data can be tested by all, none or some of the defined tests, and wherein it is only necessary to get a TRUE result on one of the enabled tests for the texture data element to be processed as TRUE.

26. Apparatus according to claim 25, further including means for holding a state variable that both identifies the one of the group of tests and identifies the predetermined subset of the number of bits.

27. Apparatus according to claim 26, wherein the state variable also identifies whether the discrimination procedure is enabled or not enabled.

28. A 3D graphics rasterizer chip, comprising:
a chip substrate;
a texture memory fetch circuit formed on the chip substrate for fetching initial texture data values including more than one component from a memory containing texture data;
a texture filter circuit formed on the chip substrate for filtering texture values; and an alpha discriminator unit formed on the chip substrate for processing the initial texture data values, and including
  i) a determination circuit to determine whether a discrimination procedure is enabled or not enabled,
  ii) a test circuit to perform a preset test on a component of the texture data value not representing color or distance if the discrimination procedure is enabled,
  iii) a processing circuit to process the initial texture data values on the basis of the result of the test to produce processed texture data values, and
  iv) an output to pass the processed texture data values to the texture filter circuit if the discrimination procedure is enabled.

29. A graphics rasterizer chip according to claim 28, wherein the test has one of two results, and the processing circuit includes:
  a first subcircuit for processing the initial texture data value according to a first procedure if the test has a first of the two results; and
  a second subcircuit for processing the initial texture data value according to a second procedure if the test has a second of the two results.

30. A graphics rasterizer chip according to claim 28, wherein the test circuit includes means for performing a plurality of different types of tests.

31. A graphics rasterizer chip according to claim 28, wherein the initial texture values have a predetermined number of component bits, and the processing circuit includes:
  means for holding a state variable identifying a subset of said number of component bits; and
  means for processing the subset of said number of component bits according to the results of the test.

32. An article of manufacture for use with a computer graphics display system having a texturing function, wherein the texturing function includes a memory containing texture data including more than one component and an alpha discriminator unit for processing the texture data, and wherein the alpha discriminator unit includes a test circuit for performing a plurality of types of tests on a component of the texture data not representing color or distance, and a processing circuit for processing the texture data according to the results of the test to produce processed texture data values, the article of manufacture comprising:
  a computer usable medium having computer readable program code embodied therein for causing the alpha discriminator unit to perform a particular one of said plurality of types of tests.

33. An article of manufacture according to claim 32, wherein said plurality of tests include a group of tests in which a predefined parameter is compared to a reference value, and wherein said computer readable program code gives a value for the reference value.

34. An article of manufacture according to claim 32, wherein the alpha discriminator unit further includes means to determine whether a discrimination procedure is enabled or not enabled, and the test circuit performs said tests if the discrimination procedure is enabled, and wherein the computer readable program code includes a state variable that indicates whether the discrimination procedure is enable or not enabled.

35. An article of manufacture for use with a computer graphics display system having a texturing function, wherein the texturing function includes a memory containing texture data including more than one component and an alpha discriminator unit for processing the texture data, the article of manufacture comprising:
  a computer usable medium having computer readable program code embodied therein for causing the texturing function (i) to identify a texture data, (ii) to determine whether a discrimination procedure is enabled or not enabled, (iii) if the discrimination procedure is enabled, to perform a test on a component of the texture data not representing color or distance, and to modify the texture according to the results of the test.

36. An article of manufacture according to claim 35, wherein said computer readable program code provides said test.

37. An article of manufacture according to claim 35, wherein the computer readable program code includes a state variable that indicates whether the discrimination procedure is enabled or not enabled.

38. A program storage device readable by a machine, tangibly embodying a program of instructions executable by the machine to perform method steps for processing a texture data value in a computer graphics display system, said method steps comprising:
  identifying an initial texture data value having more than one component;
  determining whether a discrimination procedure is enabled or not enabled;
  if the discrimination procedure is enabled, then performing a preset test on a component of the texture data value not representing color or distance;
  processing the initial texture data value according to the results of the test to produce a processed texture data value.

39. A program storage device according to claim 38, wherein the test has one of two results, and the processing step includes the steps of:
  processing the initial texture data value according to a first procedure if the test has a first of the two results;
  processing the initial texture data value according to a second procedure if the test has a second of the two results.

40. A program storage device according to claim 39, wherein the first procedure is to set the processed texture data value equal to the initial texture data value.

41. A program storage device according to claim 39, wherein the second procedure is to reset the initial texture value to a preset constant value to obtain the processed texture data value.

42. A program storage device according to claim 38, wherein the performing step includes the step of comparing the value of a pre-identified parameter with a predetermined reference value.

43. A graphics adapter board, comprising:
  a memory for containing texture data values;
  a texture memory fetch circuit for fetching initial texture data values including more than one component from the memory;
  a texture filter circuit for filtering texture values; and
  an alpha discriminator unit formed for processing the texture data values fetched from the memory, and including
    i) a determination circuit to determine whether a discrimination procedure is enabled or not enabled,
    ii) a test circuit to perform a preset test on a component of the texture data value not representing color or distance if the discrimination procedure is enabled, iii) a processing circuit to process the texture data values fetched from the memory according to the results of the test to produce processed texture data values, and iv) an output to pass the texture data values fetched from the memory to the texture filter circuit if the discrimination procedure is not enabled, and to pass the processed texture data values to the texture filter circuit if the discrimination procedure is enabled.

44. A graphics adapter board according to claim 43, wherein the test has one of two results, and the processing circuit includes:

a first subcircuit for processing the initial texture data value according to a first procedure if the test has a first of the two results; and a second subcircuit for processing the initial texture data value according to a second procedure if the test has a second of the two results.

45. A graphics adapter board according to claim 43, wherein the test circuit includes means for performing a plurality of different types of tests.

46. A graphics adapter board according to claim 43, wherein the texture values fetched from the memory have a predetermined number of component bits, and the processing circuit includes:

means for holding a state variable identifying a subset of said number of component bits; and means for processing the subset of said number of component bits according to the results of the tests.

* * * * *